Figure 1:
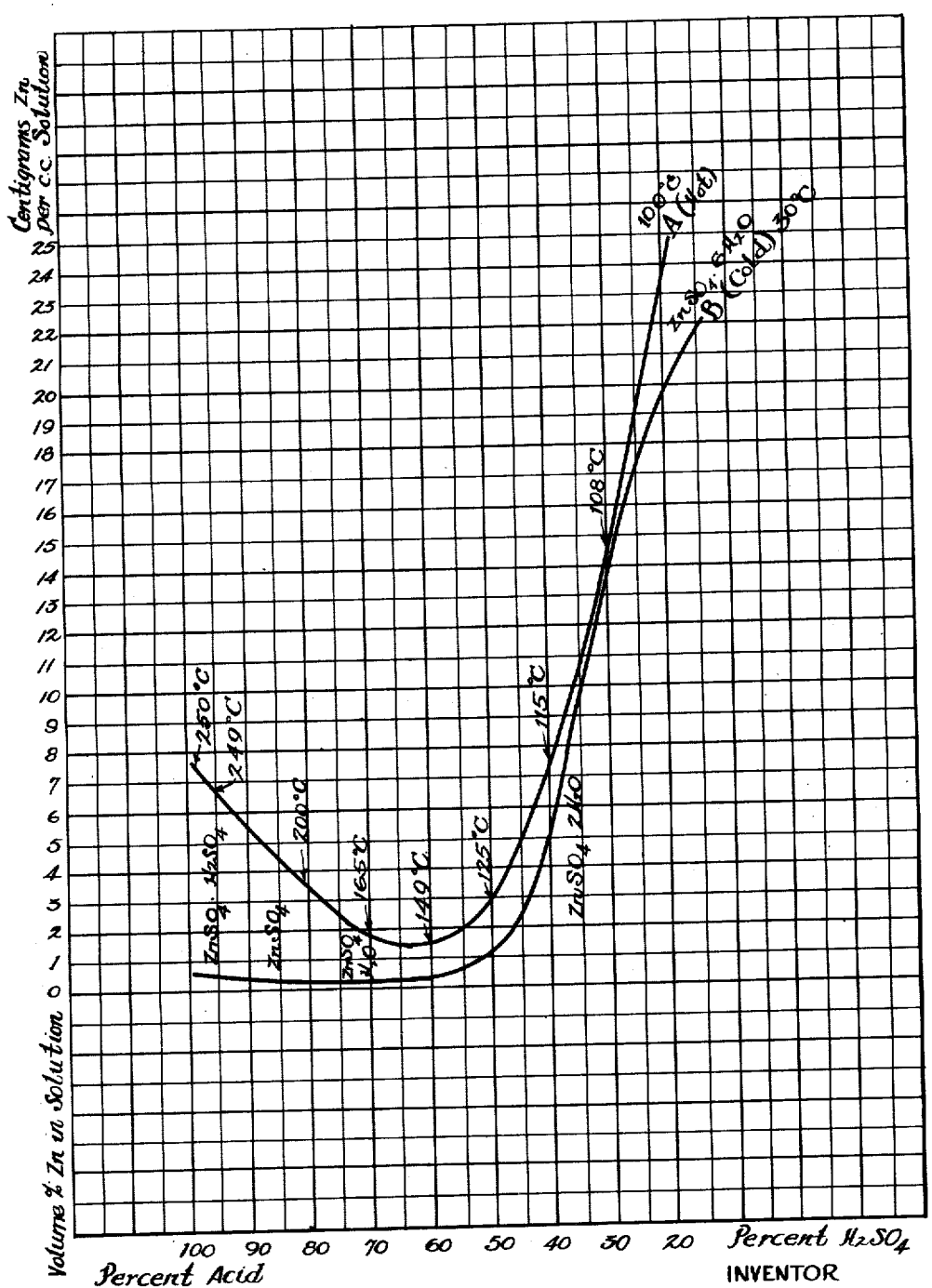

UNITED STATES PATENT OFFICE

1,937,634

PROCESS OF TREATING ZINC ORES

Niels C. Christensen, Salt Lake City, Utah

Application September 23, 1931
Serial No. 564,697

17 Claims. (Cl. 204—15)

This invention relates to the treatment of zinc sulphide ores for the recovery of the zinc therefrom. The invention is a modification of the process disclosed in my copending applications 523,575 and 523,576. It relates especially to the recovery of the zinc from sulphide ores by hydrometallurgic methods to recover the zinc in a zinc sulphate solution and the recovery of the zinc therefrom by electrolysis. In the treatment of the sulphide ores of zinc by this invention, a proportion of oxidized zinc ore (or calcined sulphide ore) is also treated so that the process includes the treatment of all classes of zinc ores.

As discussed in above mentioned patent applications, I have found that zinc sulphide in ores may be decomposed by treatment with hot relatively concentrated sulphuric acids, containing above approximately 50% $H_2SO_4$. Though acids below this concentration have some effect, for complete decomposition within a reasonable time period, acids above 60% $H_2SO_4$ are necessary and in the treatment of most ores, acids containing about 65% $H_2SO_4$ (=51.7° Bé.) are preferable. As noted in my U. S. Patents 1,434,084, 1,415,797, and 1,435,699 and in my copending patent applications 523,575 and 523,576, the action of the acid on the zinc sulphide varies with the concentration. Acids below approximately 75% decompose the ZnS forming ZnSO and driving off the sulphur as $H_2S$ as indicated in the following chemical equation:

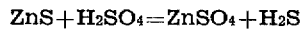

Acids of higher concentration react with the $H_2S$ reducing the acid and forming sulphur, this effect increasing with increase in acid concentration until with acids containing 95% $H_2SO_4$ or more, no $H_2S$ is formed, the zinc being sulphated and the sulphur separated as metallic sulphur, the reaction proceeding probably as indicated below:

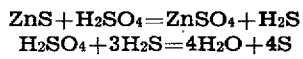

or

The sulphur thus formed also reacts with the hot concentrated acid to form SO as indicated below:

$$2H_2SO_4 + S = 2H_2O + 3SO_2$$

From the foregoing it will therefore be apparent that with concentrated acids there is a considerably greater consumption of acid than with the acids of lower concentration, and that the sulphur is not recovered as $H_2S$ but is left in mixture with the undissolved residue as elemental sulphur or in part driven off as $SO_2$. Due to these conditions as well as the greater difficulty and danger in handling the more concentrated acids, it is preferred to use acids of a concentration between 60% and 70% and to recover the sulphur from the zinc sulphide as $H_2S$. Acid of not over 65% is most efficient.

As noted in the above mentioned U. S. patents and patent applications, the action of the acid upon the ZnS depends upon the conditions of treatment. The ZnS may be completely sulphated and dissolved by merely agitating the finely ground ore with a sufficient volume of the hot acid and the zinc sulphate may be recovered by cooling the acid as described in my U. S. patents mentioned above. Due to the low solubility of ZnSO in acids of a concentration between 60% and 70% $H_2SO_4$ this method requires such a large volume of acid as to seriously militate against its practical use. The first filtration, cooling, second filtration, reheating, and handling (pumping, etc.) of such large quantities of acid as are required in the above mentioned process and the relatively large equipment required due to this large volume of acid, are serious disadvantages and obstacles in the commercial use of the processes of my said prior patents. I have now discovered that by converting the zinc sulphide in these ores directly into solid zinc sulphate by treatment with a small excess of the hot sulphuric acid, (instead of dissolving the zinc sulphate in the hot acid as the zinc sulphate is formed and then precipitating the zinc sulphate by cooling the acid solution), the volume of excess acid which is required may be very greatly reduced and the cooling and reheating of the large excess acid may be avoided, thus greatly reducing the cost and difficulty of the entire process, and this also reduces the cost and size of the equipment required in the process. This direct conversion of the zinc sulphide to solid zinc sulphate may be brought about by a prolonged agitation of finely divided ore with an excess of hot acid sufficient to form a fluid pulp, i. e. a mixture of such consistency that it may be mixed and agitated without difficulty. I have also discovered that the time of treatment required to secure a practically complete conversion of the zinc sulphide to the solid zinc sulphate by treatment with the hot acid may be greatly reduced by grinding the finely divided ore during treatment with the hot acid. Such a process is claimed in my application Ser. No.

565,153, filed Sept. 25, 1931, and 523,575 filed May 18, 1931. Without grinding, if the volume of acid is very much less than that required to dissolve the $ZnSO_4$, an insoluble coating of $ZnSO_4$ is formed on the ZnS particles which prevents the rapid action of the $H_2SO_4$ on the ZnS and thus prevents complete sulphating unless the treatment is continued for a relatively long period of time. If during the treatment of the ZnS with the acid, the mixture is subjected to grinding or attrition in a suitable pebble mill or other grinding device, this coating is removed as rapidly as it is formed and the reaction proceeds rapidly to completion, the ZnS being completely sulphated and the sulphur driven off as $H_2S$ in from 10 to 30 minutes. By this treatment the excess acid required may be reduced to from one to three parts of acid to one of ore, depending upon the percentage of zinc carried in the ore and the type of apparatus used in carrying out the treatment.

The solid $ZnSO_4$ formed by this treatment remains mixed with the excess acid and insoluble ore residue, consisting in most cases of pyrite, lead sulphate, silica, etc. To recover the zinc sulphate the excess $H_2SO_4$ is removed as far as possible by filtration, and if desired by a "flash" wash with water, the excess acid, and wash if any, being heated and concentrated if necessary, and reused for the sulphating of more ore. The filter cake from this operation, containing the solid $ZnSO_4$ with residual excess acid, and ore residue, is then lixiviated with hot water to form a hot acid concentrated $ZnSO_4$ solution, which is neutralized with oxidized zinc ore (or calcines) and the iron, and other impurities in solution precipitated therefrom by means of the oxidized ore and a suitable oxidizing agent, to form a neutral zinc sulphate solution. This solution is treated with zinc dust to precipitate cadmium, copper, silver, lead, etc., from solution, and this pure concentrated neutral zinc sulphate solution is then electrolyzed in suitable electrolytic cells, as in standard practice, to remove as much of the zinc as possible. The spent solution from the electrolytic circuit containing the $H_2SO_4$ generated in the electrolysis and the residual $ZnSO_4$ is concentrated and heated and used together with the excess acid filtered out of the sulphated pulp as above described, for the treatment of more ore. The concentration of the spent acid from the electrolytic circuit precipitates the residual $ZnSO_4$ therefrom which is filtered out and returned to the electrolytic circuit as described below.

Figure 2:
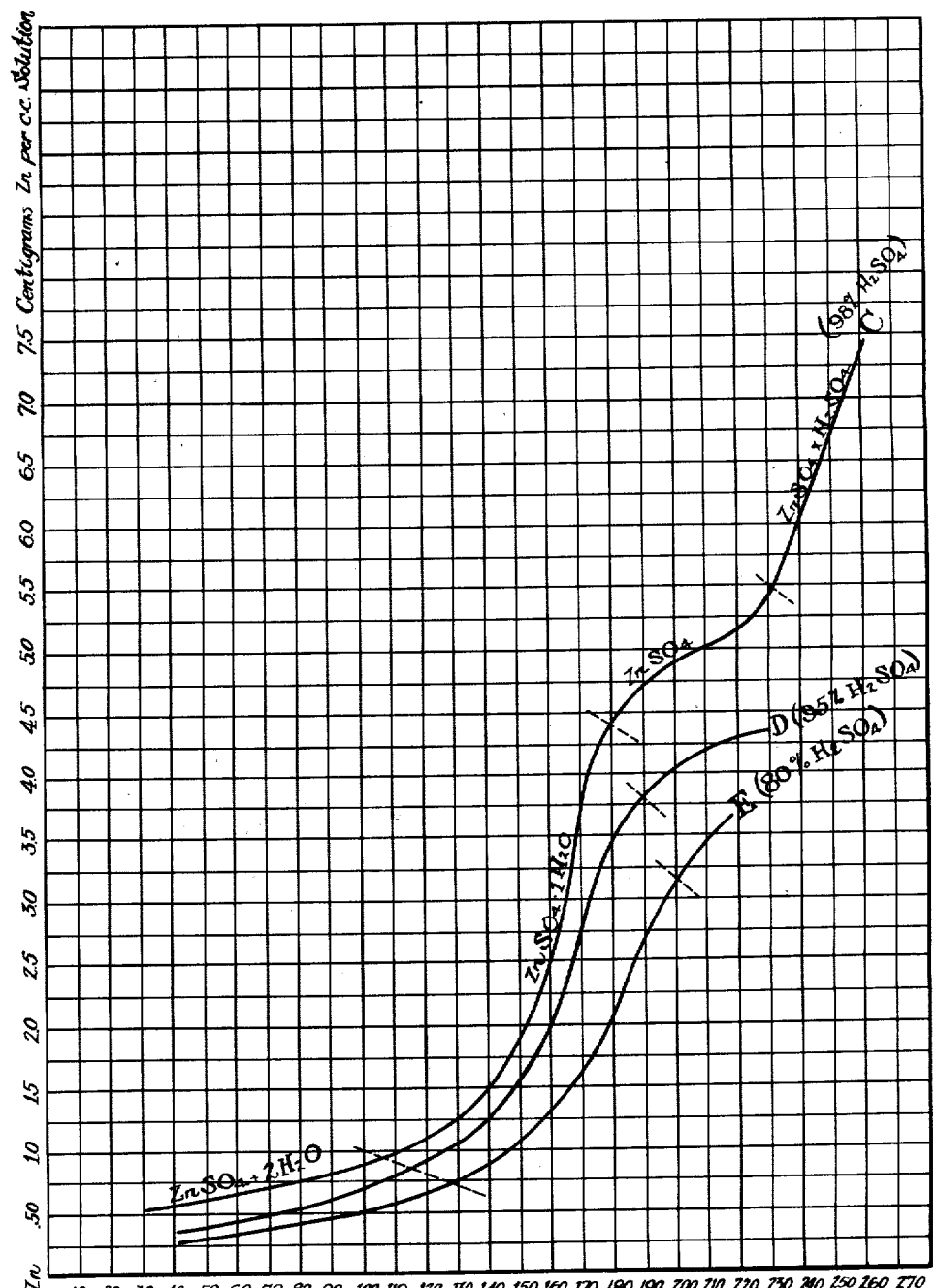
Figure 3:
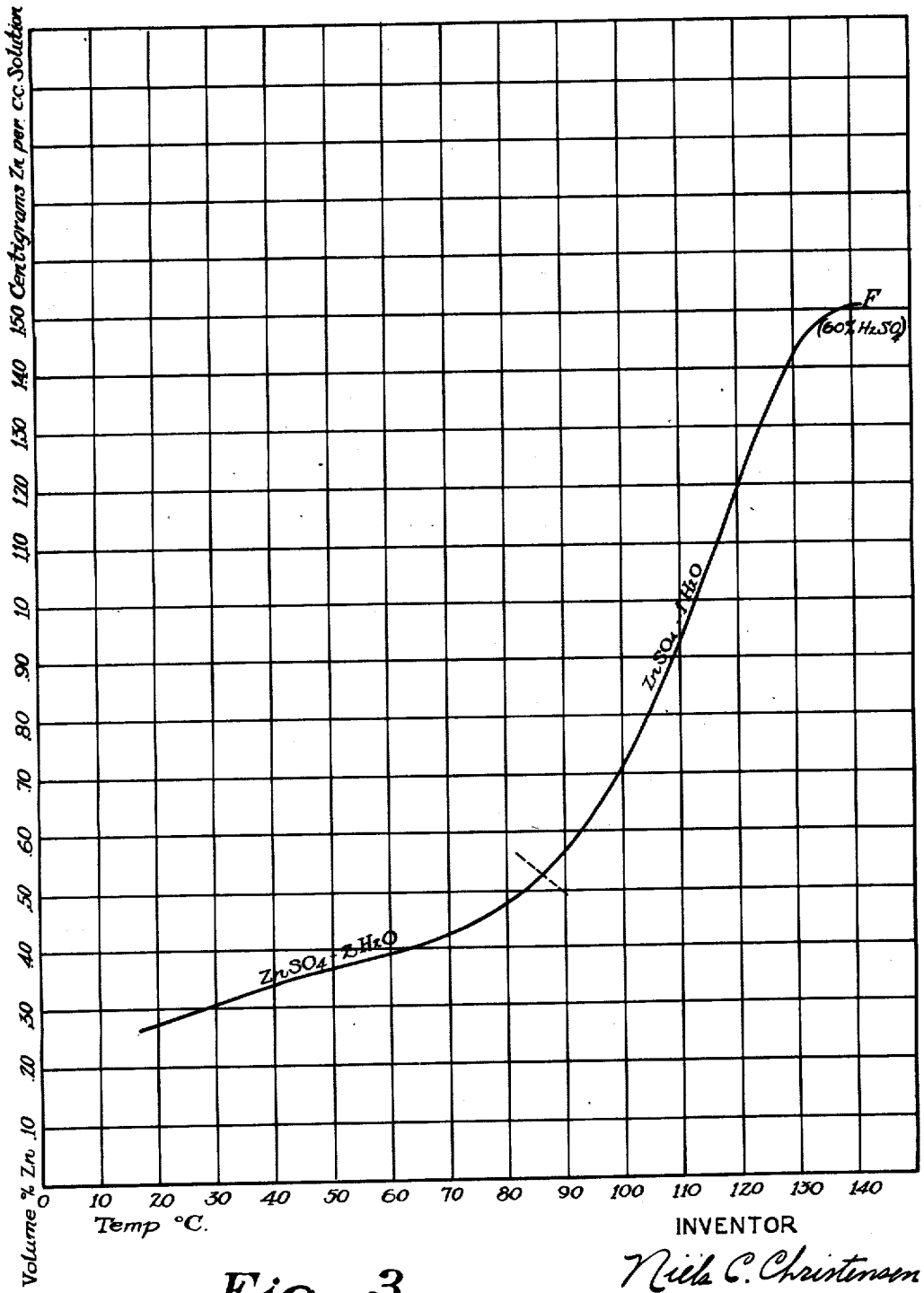
Figure 4:
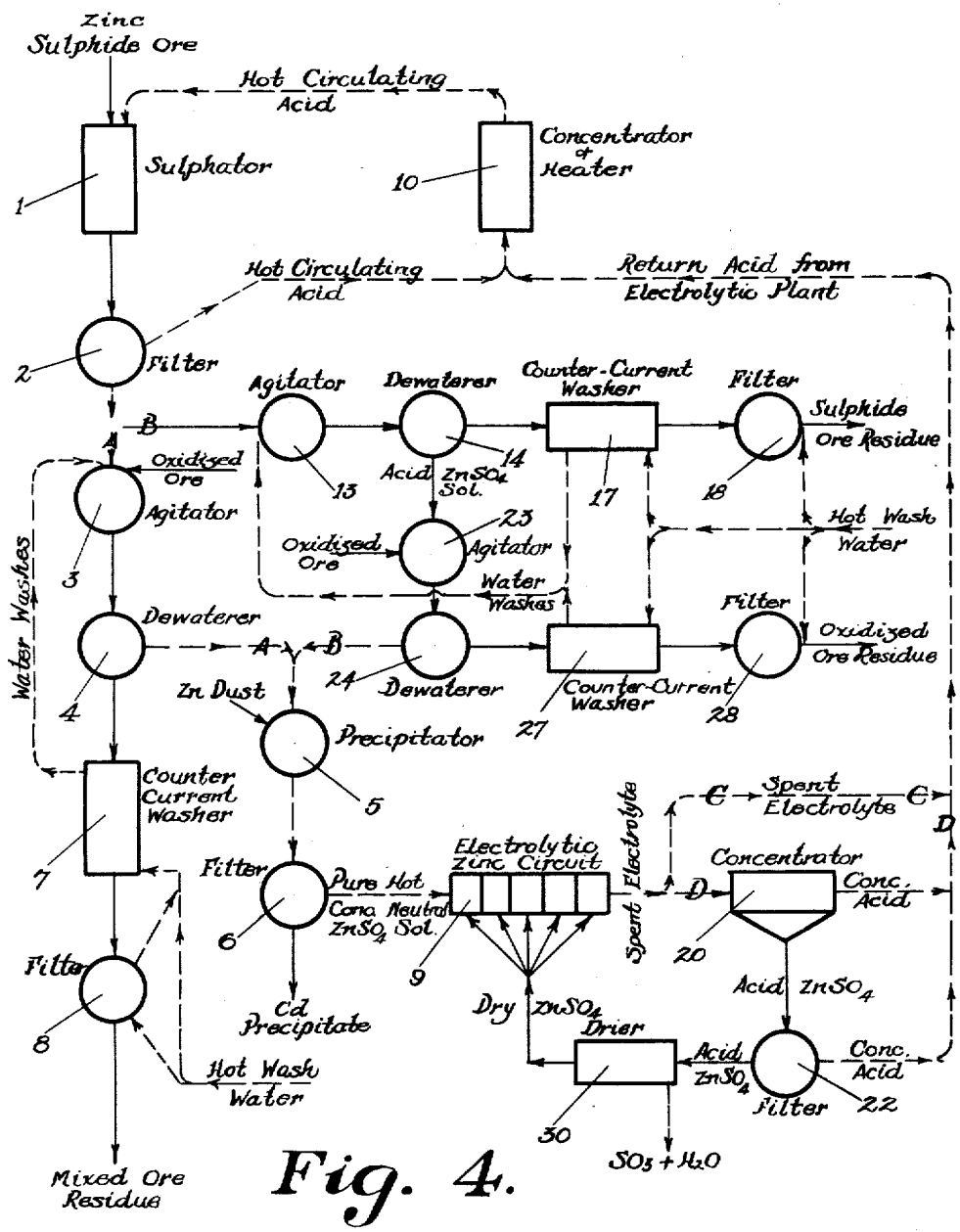

The application of the invention to the treatment of ores is more fully covered in the following description which is illustrated by the accompanying drawings. Figures 1, 2 and 3 are curves showing the solubility of $ZnSO_4$ in sulphuric acid of different concentrations and at different temperatures, and Figure 4 is a flow sheet showing various methods of carrying out the process.

As described in the foregoing and in my copending patent applications the finely divided zinc sulphide ore, or concentrate, is ground with an excess of hot relatively concentrated sulphuric acid until the zinc is completely sulphated and the $H_2S$ driven off. This operation is carried out in the sulphator (1) which consists preferably of an acid proof pebble mill with a silex or porcelain lining and supplied with small quartz pebbles or porcelain marbles for the attrition or grinding medium. The hot excess, or circulating, acid from the heater and concentrator (10) in which the ore is ground should preferably contain between 60% and 70% $H_2SO_4$ though acids of higher concentration may be used as noted above. The amount of acid consumed in sulphating the zinc in the sulphide and oxidized ore treated in the process is constantly returned to the sulphator (1) from the electrolytic circuit (9) as described below. This return acid may be mixed with the hot circulating acid (in most cases approximately 65% $H_2SO_4$) and raised to the proper concentration in the concentrator and heater (10) or may first be concentrated for removal of the $ZnSO_4$, as later described, and thereafter be mixed with the circulating acid in the concentrator (10). Sufficient circulating acid to form a fluid pulp with the ore and zinc sulphate formed should be used. This amount may vary from approximately one part to three or more parts of acid to one of ore. The sulphator (1) may be jacketed or externally heated if desired to maintain the proper temperature, though external heating will only be essential if the amount of ore being treated is small. The sulphating may be carried out in batches but is preferably conducted as a continuous operation. To avoid loss of $H_2S$ and contamination of this gas with air, the ore and acid is preferably fed into and discharged from the sulphator (1) through suitable air tight glands. With efficient grinding or attrition the sulphating operation requires only a short time, usually from 10 to 30 minutes depending upon the fineness of original grinding and also upon the character of the ore, some ore being more rapidly sulphated than others.

As stated above, with each ton of the zinc sulphide ore, I may use generally about one to three tons of acid, whereas when treating a ton of sulphide ore containing about 19% of Zn, by the process of my prior Patent No. 1,434,084, the amount of sulphuric acid is about 30 tons, and when treating a concentrate containing 58% of Zn, the acid is over 90 times the weight of the ore. This statement is made to illustrate the immense difference in the amounts of acid to be handled in the present case and in my said prior patents.

The fluid pulp from the sulphator (1), consisting of the excess acid, solid zinc sulphate and ore residue, is passed to the filter (2) where the excess or circulating acid is filtered out and, if it is desired to limit the amount of oxidized ore to be treated, the solids may be given a "flash" wash to remove as much of the residual acid as possible without dissolving any considerable amount of the zinc sulphate.

The neutral zinc sulphate solution for the electrolytic circuit may be prepared in two different ways as indicated in lines A to A and B to B in the flow sheet. In the simpler of the two methods, shown from A to A, in which the residues from the sulphide and oxidized ores are not kept separate, the acid filter cake from the filter (2) is mixed with sufficient hot water in the agitator (3) to dissolve the zinc sulphate and form a hot acid concentrated zinc sulphate solution. To this mixture enough oxidized zinc ore is added to neutralize the acid in solution and sufficient oxidizing agent to precipitate all the iron from solution. The mixture of neutral solution and ore residue from this treatment passes to the dewaterer (4) in which the hot neutral concentrated zinc sulphate solution is filtered away from the mixed ore residue. The ore residue is then passed through the countercurrent washer (7) where it is washed free from the residual zinc sulphate solution, and finally to the filter (8) from which it is sent to the brine leaching operation, flotation, or to waste. The wash solutions from the counter current washer (7) and filter (8) are sent to the agitator (3) as shown. If the residues from the sulphide and oxidized ores are to be kept separate the second method shown from B to B in the flow sheet is used. In this case the acid filter cake from the filter (2) is mixed with sufficient water in the agitator (13) to dissolve the ZnSO4 and form a hot acid concentrated zinc sulphate solution. This solution is separated from the leached ore residue in the dewaterer (14) from which the sulphide ore residue is sent to the counter-current washer (17) and filter (18) for recovery of the residual zinc sulphate solution by washing, the wash solutions being sent to the agitator (13). The acid zinc sulphate solution from the dewaterer (14) goes to the agitator (23) where it is mixed with sufficient oxidized zinc ore (or calcines) to neutralize the acid and dissolve the zinc in the oxidized ore. Sufficient oxidizing agent is added in this operation to precipitate the iron from the zinc sulphate solution. The mixture of ore residue and precipitate is separated from the neutral solution in the dewaterer (24) and the residue of leached ore is sent through the counter-current washer (27) and to the filter (28) for recovery of the residual zinc sulphate solution by washing, the washed ore residue being sent to the brine leaching operation (for recovery of Pb and Ag), or flotation, or to waste, and the wash solutions being sent to the agitator (13 as shown. It will be seen that the first method (A to A) avoids a complete neutralizing, filtering and washing operation which is required in the second method (B to B) and the first method will therefore be preferred unless the sulphide and oxidized ore residues must be kept separate.

The hot concentrated neutral zinc sulphate solution secured by either of the methods described (A to A or B to B) is treated with zinc dust in the precipitator (5) to remove any cadmium, silver, copper or traces of lead carried in the solution. The precipitated metals and the excess zinc dust are filtered out of the purified solution in the filter (6) and the pure hot concentrated neutral zinc sulphate solution is passed through the electrolytic cells (9) where zinc is precipitated and H2SO4 recovered in solution by electrolysis. If the electrolytic plant is operated as at Anaconda or Trail, i. e., with a spent electrolyte of relatively low acid concentration, the spent electrolyte containing the residual ZnSO4 and the acid generated in the electrolysis will preferably be returned to the concentrator and heater (10) (as indicated by the flow C to C) in which the acid is concentrated to the desired point (62–65% H2SO4 or higher) and is used over again in the treatment of more ore along with the circulating acid in the circuit. As will be noted by reference to the curves in Figs. 1 and 2, the concentration of the spent electrolyte precipitates the greater part of the ZnSO4 which is recovered on the filter (2) and passed through the circuit again, the zinc sulphate in the spent electrolyte being thus a constant circulating load. If it is desired to operate the electrolytic circuit so as to produce a spent electrolyte of higher acid concentration, similar to that used in the Tainton process, the spent electrolyte may be sent through the concentrator (20) (as indicated by the flow D to D) in which the acid concentration is raised to approximately 60% so as to throw out most of the ZnSO4 in solution. This solid zinc sulphate is separated from the excess acid in the concentrator (20) and filter (22) and returned to the electrolytic circuit (9) to keep up the zinc concentration necessary for successful electrolysis with a high acid electrolyte. The solid ZnSO4 is preferably added to the electrolyte at suitable intervals in the circuit by passing the current of electrolyte through suitable agitators between the cells to which the solid ZnSO4 is added in such quantity as to maintain a substantially saturated ZnSO4 solution. If desired, the solid zinc sulphate thus returned to the circuit may be passed through the drier (30) to remove the residual acid before its return to the circuit or may be sent directly from the filter (22). The concentrated acid from concentrator (20) and filter (22) is returned to the concentrator and heater (10) and mixed with the circulating acid and used over again in the treatment of more ore. If the zinc sulphate from the filter (22) is dried before return to the electrolytic circuit, the SO3 driven off in this operation is suitably absorbed for reuse in the process.

It will be obvious that the apparatus shown on the flow sheet and described in the foregoing as the preferred means for carrying out the process is not essential to the operation of the process, but that any other form of apparatus suitable for carrying out the process may be used if desired.

From the foregoing description it will be apparent that by this process zinc may be recovered from raw sulphide ores by electrolytic methods thus avoiding the necessity of roasting the ores before leaching. By this process all types of zinc sulphide ores may be treated for the recovery of the zinc such as pure zinc ores or concentrates or mixed lead zinc sulphide ores or concentrates together with a proportion of oxidized zinc ores (or lead zinc ores) or calcines. The process is particularly well suited for the treatment of mixed lead-zinc ores since the residues from the treatment of these ores by the methods described in the foregoing are well suited for the recovery of the lead and silver therefrom by brine leaching and for the recovery of the gold and pyrite thereafter by flotation as described in my copending patent applications 565,861; 565,862 and 568,514.

Having described my invention, what I claim and desire to patent is:

1. The process of treating zinc sulphide ores and concentrates for the recovery of metallic zinc therefrom which consists in treating said ores and the like with only a small excess of hot sulphuric acid of such concentration that said zinc sulphide is converted directly into solid zinc sulphate, the amount of said acid being sufficient to completely sulphate the zinc but being only a small fraction of the amount which would be necessary to dissolve the zinc sulphate, and filtering said excess acid from said solid zinc sulphate and ore residue, and using said excess acid in the treatment of more ore, and mixing said solid zinc sulphate and ore residue with sufficient water to dissolve said zinc sulphate and form an acid, concentrated zinc sulphate solution, and adding sufficient oxidized zinc ore to said mixture to neutralize the acid in said last mentioned solution and sufficient oxidizing agent to precipitate the iron therefrom, and separating the hot neutral zinc sulphate solution thus formed from the mixed ore residues, and treating said neutral ZnSO4 solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating said last mentioned acid solution and using said concentrated acid solution in the treatment of more zinc sulphide ore material as described above.

2. The process of treating zinc sulphide ores and concentrates for the recovery of metallic zinc therefrom which consists in grinding said ores and the like with such an excess of hot sulphuric acid of such concentration that said zinc sulphide is converted to solid zinc sulphate, and filtering said excess acid from said solid zinc sulphate and ore residue, and using said excess acid in the treatment of more ore, and mixing said solid zinc sulphate and ore residue with sufficient water to dissolve said zinc sulphate and form an acid, concentrated zinc sulphate solution, and adding sufficient oxidized zinc ore to said mixture to neutralize the acid in said last mentioned solution and sufficient oxidizing agent to precipitate the iron therefrom, and separating the hot neutral zinc sulphate solution thus formed from the mixed ore residues, and treating said neutral zinc sulphate solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating said last mentioned acid solution and precipitating zinc sulphate therefrom and separating said precipitated zinc sulphate from said concentrated acid and dissolving said zinc sulphate in zinc sulphate solution being electrolyzed as described above, and using said last mentioned hot concentrated acid in the treatment of more zinc sulphide ore material as described.

3. The process of treating zinc sulphide ores and concentrates for the recovery of metallic zinc therefrom which consists in grinding said ores and the like with such an excess of hot sulphuric acid of such concentration that said zinc sulphide is converted to solid zinc sulphate, and filtering said excess acid from said solid zinc sulphate and ore residue, and using said excess acid in the treatment of more ore, and mixing said solid zinc sulphate and ore residue with sufficient water to dissolve said zinc sulphate and form an acid concentrated zinc sulphate solution, and adding sufficient oxidized zinc ore to said mixture to neutralize the acid in last said solution and sufficient oxidizing agent to precipitate the iron therefrom, and separating the hot neutral zinc sulphate solution thus formed from the mixed ore residues, and treating last said solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating last said acid solution, and precipitating zinc sulphate therefrom and separating said precipitated zinc sulphate from said concentrated acid and heating said precipitate to drive off entrained acid therefrom and dissolving said dried zinc sulphate in zinc sulphate solution being electrolyzed as described above, and using last said hot concentrated acid in the treatment of more zinc sulphide ore material as described.

4. The process of treating zinc sulphide ores and concentrates which consists in grinding said ores and the like with such an excess of hot sulphuric acid of such concentration that the zinc sulphide is converted to solid zinc sulphate, the amount of such hot sulphuric acid present during such step being insufficient to dissolve a major fraction of the zinc sulphate formed from the zinc sulphide constituent of said ore material, and filtering the excess acid away from said solid zinc sulphate and ore residue and using said acid in the treatment of more ore, and mixing said solid zinc sulphate and ore residue with sufficient water to dissolve said zinc sulphate and form an acid concentrated zinc sulphate solution and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and using said concentrated acid solution in the treatment of more zinc sulphide ore material as described above.

5. The process of treating zinc sulphide ores and concentrates which consists in grinding said ores and the like with such an excess of hot sulphuric acid of such concentration that the zinc sulphide is converted to solid zinc sulphate, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid, and dissolving said zinc sulphate in zinc sulphate solution being electrolyzed as described above, and using last said hot concentrated acid in the treatment of more zinc sulphide ore material as described above.

6. The process of treating zinc sulphide ores and concentrates which consists in grinding said ores and the like with such an excess of hot sulphuric acid of such concentration that the zinc sulphide is converted to solid zinc sulphate, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid and heating said precipitate to drive off entrained acid therefrom, and dissolving said dried zinc sulphate in zinc sulphate solution being electrolyzed as described above, and using last said concentrated acid in the treatment of more zinc sulphide ore material as described above.

7. The process of treating zinc sulphide ores and concentrates for the recovery of metallic zinc therefrom which consists in treating said ores and the like with an excess of hot sulphuric acid of such concentration so that said zinc sulphide is converted to solid zinc sulphate, and the sulphur is driven off as $H_2S$, the amount of such hot sulphuric acid present during such step being insufficient to dissolve any considerable proportion of the zinc sulphate formed from the zinc sulphide in the ore used in said step, and filtering said excess acid from said solid zinc sulphate and ore residue, and using said excess acid in the treatment of more ore, and mixing said solid zinc sulphate and ore residue with sufficient water to dissolve said zinc sulphate and form an acid, concentrated zinc sulphate solution, and adding sufficient oxidized zinc ore to said acid zinc sulphate solution to neutralize the acid in said solution and sufficient oxidizing agent to precipitate the iron therefrom, and separating the hot neutral zinc sulphate solution thus formed from the insolubles, and treating last said solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating last said acid solution and using said concentrated acid solution in the treatment of more zinc sulphide ore material as described above.

8. The process of treating zinc sulphide ores and concentrates for the recovery of metallic zinc therefrom which consists in grinding said ores and the like with such an excess of hot sulphuric acid of such concentration that said zinc sulphide is converted to solid zinc sulphate, and the sulphur is driven off as $H_2S$, and filtering said excess acid from said solid zinc sulphate and ore residue, and using said excess acid in the treatment of more ore, and mixing said solid zinc sulphate and ore residue with sufficient water to dissolve said zinc sulphate and from an acid concentrated zinc sulphate solution, and adding sufficient oxidized zinc ore to said mixture to neutralize the acid in last solution and sufficient oxidizing agent to precipitate the iron therefrom, and separating the hot neutral zinc sulphate solution thus formed from the mixed ore residues, and treating last said solution with metallic zinc to precipitate therefrom metals lower than zinc in the electromotive series and separating the solution thus purified from said precipitated metals and excess of metallic zinc, and electrolyzing said solution to precipitate zinc metal therefrom and form and acid solution, and heating and concentrating last said acid solution and precipitating zinc sulphate therefrom and separating said precipitated zinc sulphate from said concentrated acid and dissolving said zinc sulphate in zinc sulphate solution being electrolyzed as described above, and using last said hot concentrated acid in the treatment of ore zinc sulphide ore material as described.

9. The process of treating zinc sulphide ores and concentrates for the recovery of metallic zinc therefrom which consists in grinding said ores and the like with such an excess of hot sulphuric acid of such concentration that said zinc sulphide is converted to solid zinc sulphate, and the sulphur is driven off as $H_2S$, and filtering said excess acid from said solid zinc sulphate and ore residue, and using said excess acid in the treatment of more ore, and mixing said solid zinc sulphate and ore residue with sufficient water to dissolve said zinc sulphate and form an acid concentrated zinc sulphate solution, and adding sufficient oxidized zinc ore to said mixture to neutralize the acid in last said solution and sufficient oxidizing agent to precipitate the iron therefrom, and separating the hot neutral zinc sulphate solution thus formed from the mixed ore residues, and treating last said solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating last said acid solution, and precipitating zinc sulphate therefrom and separating said precipitated zinc sulphate from said concentrated acid and heating said precipitate to drive off entrained acid therefrom and dissolving said dried zinc sulphate in zinc sulphate solution being electrolyzed as described above, and using last said hot concentrated acid in the treatment of more zinc sulphide ore material as described.

10. The process of treating zinc sulphide ores and concentrates which consists in grinding said ores and the like with such an excess of hot sulphuric acid of such concentration that the zinc sulphide is converted to solid zinc sulphate, and the sulphur is driven off as $H_2S$, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitates and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid, and dissolving said zinc sulphate in zinc sulphate solution being electrolyzed as described above, and using last said hot concentrated acid in the treatment of more zinc sulphide ore material as described above.

11. The process of treating zinc sulphide ores and concentrates which consists in grinding said ores and the like with such an excess of hot sulphuric acid of such concentration that the zinc sulphide is converted to solid zinc sulphate, and the sulphur is driven off as H₂S, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid and heating said precipitate to drive off entrained acid therefrom, and dissolving said dried zinc sulphate in zinc sulphate solution being electrolyzed as described above, and using last said concentrated acid in the treatment of more zinc sulphide or material as described above.

12. The process of treating zinc sulphide ores and concentrates for the recovery of metallic zinc therefrom which consists in grinding said ores and the like with only a small excess of hot sulphuric acid of a concentration between 60% and 70% so that said zinc sulphide is converted to solid zinc sulphate, the amount of said sulphuric acid being only a minor fraction of the amount which would be necessary to dissolve the zinc sulphate formed from said ore material, and mixing said solid zinc sulphate and ore residue with sufficient water to dissolve said zinc sulphate and form an acid concentrated zinc sulphate solution, neutralizing said solution and precipitating and removing substantially all of the metals lower than zinc in the electromotive series from said solution, and electrolyzing the so purified solution to precipitate zinc metal therefrom and form an acid solution, and heating and concentrating said last mentioned acid solution and using said concentrated acid solution in the treatment of more zinc sulphide ore material as described above.

13. The process of treating zinc sulphide ores and concentrates for the recovery of metallic zinc therefrom which consists in grinding said ores and the like with such an excess of hot sulphuric acid of a concentration between 60% and 70%, so that said zinc sulphide is converted to solid zinc sulphate, and filtering said excess acid from said solid zinc sulphate and ore residue, and using said excess acid in the treatment of more ore, and mixing said solid zinc sulphate and ore residue with sufficient water to dissolve said zinc sulphate and form an acid, concentrated zinc sulphate solution and adding sufficient oxidized zinc ore to said mixture to neutralize the acid in last said solution and sufficient oxidizing agent to precipitate the iron therefrom, and separating the hot neutral zinc sulphate solution thus formed from the mixed ore residues, and treating last said solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating last said acid solution and precipitating zinc sulphate therefrom and separating said precipitated zinc sulphate from said concentrated acid and dissolving said zinc sulphate in zinc sulphate solution being electrolyzed as described above, and using last said hot concentrated acid in the treatment of more zinc sulphide ore material as described.

14. The process of treating zinc sulphide ores and concentrates for the recovery of metallic zinc therefrom which consists in grinding said ores and the like with such an excess of hot sulphuric acid of a concentration between 60% and 70% so that said zinc sulphide is converted to solid zinc sulphate, and filtering said excess acid from said solid zinc sulphate and ore residue, and using said excess acid in the treatment of more ore, and mixing said solid zinc sulphate and ore residue with sufficient water to dissolve said zinc sulphate and form an acid concentrated zinc sulphate solution, and adding sufficient oxidized zinc ore to said mixture to neutralize the acid in last said solution and sufficient oxidizing agent to precipitate the iron therefrom, and separating the hot neutral zinc sulphate solution thus formed from the mixed ore residues, and treating last said solution with metallic zinc to precipitate therefrom metals lower than zinc in the electromotive series and separating the solution thus purified from said precipitated metals and excess of metallic zinc, and electrolyzing said solution to precipitate zinc metal therefrom and form an acid solution, and heating and concentrating last said acid solution, and precipitating zinc sulphate therefrom and separating said precipitated zinc sulphate from said concentrated acid and heating said precipitate to drive off entrained acid therefrom and dissolving said dried zinc sulphate in zinc sulphate solution being electrolyzed as described above, and using last said hot concentrated acid in the treatment of more zinc sulphide ore material as described above.

15. The process of treating zinc sulphide ores and concentrates which consists in grinding said ores and the like with only such an excess of hot sulphuric acid of a concentration between 60% and 70% as to convert the zinc sulphide into solid zinc sulphate, the amount of said sulphuric acid being only a small fraction of the amount which would be necessary to dissolve said zinc sulphate, and mixing said solid zinc sulphate and ore residue with sufficient water to dissolve said zinc sulphate and form an acid concentrated zinc sulphate solution, neutralizing said acid zinc sulphate solution with a zinciferous material and purifying the solution from substantially all salts of metals below zinc in the electromotive series, and electrolyzing said purified solution to precipitate metallic zinc therefrom and form an acid solution and heating and concentrating said last mentioned acid solution to a sulphuric acid content of about 60 to 70% and separating the solution from solid zinc sulphate precipitated therefrom during such concentration, and using said concentrated acid solution in the treatment of more zinc sulphate ore material as described above.

16. The process of treating zinc sulphide ores and concentrates which consists in grinding said ores and the like with such an excess of hot sulphuric acid of a concentration between 60% and 70% so that the zinc sulphide is converted to solid zinc sulphate, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid, and dissolving said zinc sulphate in zinc sulphate solution being electrolyzed as described above, and using last said hot concentrated acid in the treatment of more zinc sulphide ore material as described above.

17. The process of treating zinc sulphide ores and concentrates which consists in grinding said ores and the like with such an excess of hot sulphuric acid of a concentration between 60% and 70% so that the zinc sulphide is converted to solid zinc sulphate, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid and heating said precipitate to drive off entrained acid therefrom, and dissolving said dried zinc sulphate in zinc sulphate solution being electrolyzed as described above, and using last said concentrated acid in the treatment of more zinc sulphide ore material as described above.

NIELS C. CHRISTENSEN.

CERTIFICATE OF CORRECTION

Patent No. 1,937,634.   December 5, 1933.

NIELS C. CHRISTENSEN.

It is hereby certified that error appears in the printed specification of the above numbered patent requiring correction as follows: Page 6, line 36, claim 11, for "or" read ore; and that the said Letters Patent should be read with this correction therein that the same may conform to the record of the case in the Patent Office.

Signed and sealed this 20th day of February, A. D. 1934.

F. M. Hopkins (Seal)   Acting Commissioner of Patents.

more zinc sulphate ore material as described above.

16. The process of treating zinc sulphide ores and concentrates which consists in grinding said ores and the like with such an excess of hot sulphuric acid of a concentration between 60% and 70% so that the zinc sulphide is converted to solid zinc sulphate, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid, and dissolving said zinc sulphate in zinc sulphate solution being electrolyzed as described above, and using last said hot concentrated acid in the treatment of more zinc sulphide ore material as described above.

17. The process of treating zinc sulphide ores and concentrates which consists in grinding said ores and the like with such an excess of hot sulphuric acid of a concentration between 60% and 70% so that the zinc sulphide is converted to solid zinc sulphate, and filtering the excess acid away from said zinc sulphate and ore residue and using said acid in the treatment of more ore, and mixing said solid zinc sulphate and ore residue with sufficient water to dissolve said zinc sulphate and form an acid concentrated zinc sulphate solution, and separating said acid zinc sulphate solution from the ore residue and adding sufficient oxidized zinc ore to last said solution to neutralize the acid in said solution and sufficient oxidizing agent to precipitate the iron therefrom, and separating said neutral solution from the residue of oxidized ore and iron precipitate and treating said solution with metallic zinc to precipitate therefrom metals below zinc in the electromotive series and separating the solution thus purified from the precipitated metals and electrolyzing last said solution to precipitate metallic zinc therefrom and form an acid solution and heating and concentrating last said acid solution, and precipitating zinc sulphate therefrom and separating said precipitated zinc sulphate from said concentrated acid and heating said precipitate to drive off entrained acid therefrom, and dissolving said dried zinc sulphate in zinc sulphate solution being electrolyzed as described above, and using last said concentrated acid in the treatment of more zinc sulphide ore material as described above.

NIELS C. CHRISTENSEN.

CERTIFICATE OF CORRECTION

Patent No. 1,937,634.  December 5, 1933.

NIELS C. CHRISTENSEN.

It is hereby certified that error appears in the printed specification of the above numbered patent requiring correction as follows: Page 6, line 36, claim 11, for "or" read ore; and that the said Letters Patent should be read with this correction therein that the same may conform to the record of the case in the Patent Office.

Signed and sealed this 20th day of February, A. D. 1934.

F. M. Hopkins (Seal)  Acting Commissioner of Patents.